Feb. 2, 1937. E. C. SLOAN 2,069,393
INLAID FIBROUS BODIED ARTICLES AND METHOD OF PRODUCING SAME
Original Filed May 19, 1934
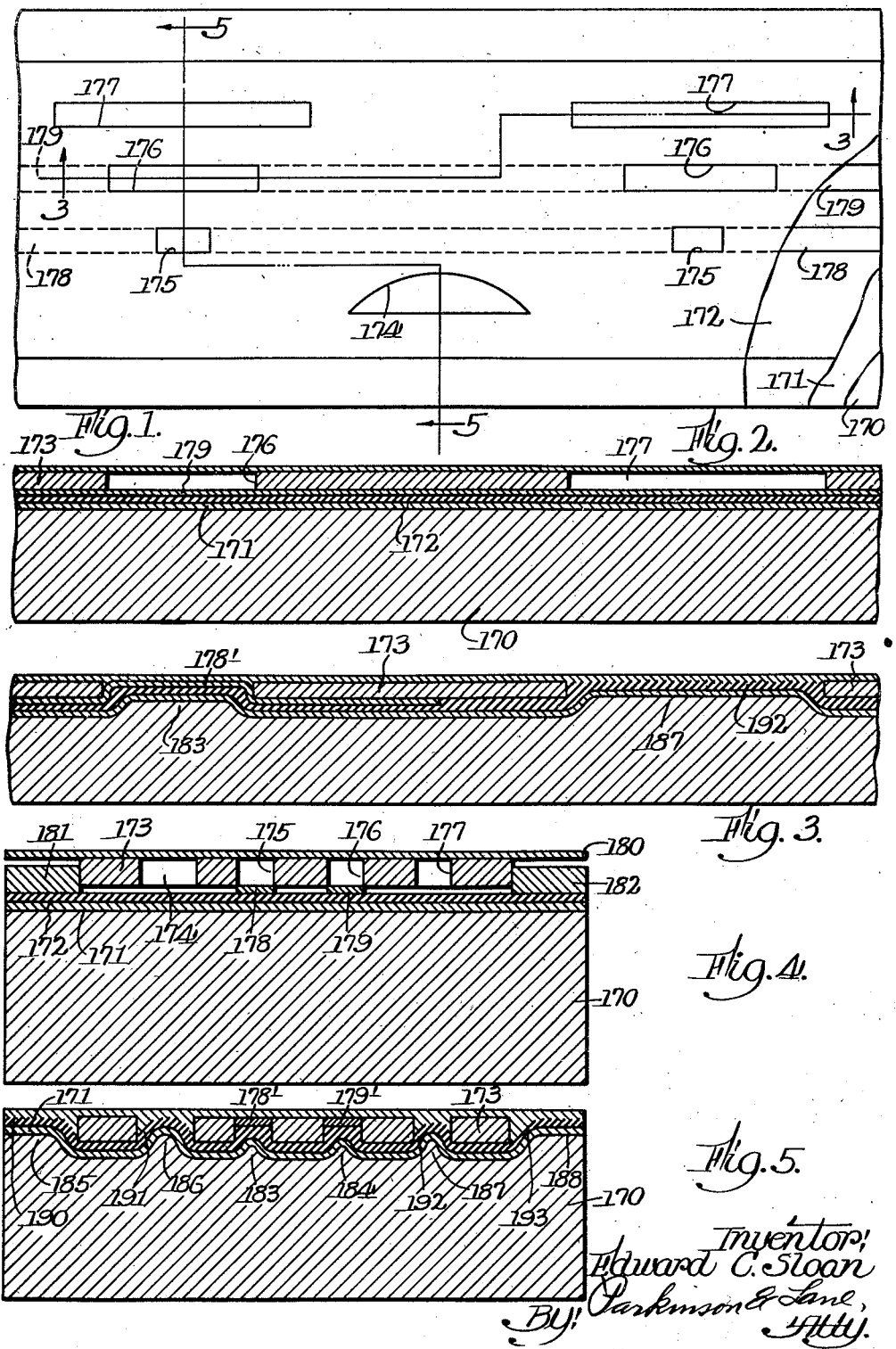
Inventor:
Edward C. Sloan
By: Parkinson & Lane,
Atty.

Patented Feb. 2, 1937

2,069,393

UNITED STATES PATENT OFFICE 2,069,393

INLAID FIBROUS BODIED ARTICLES, AND METHOD OF PRODUCING SAME

Edward C. Sloan, Geneva, Ill., assignor to Jesse B. Hawley, Geneva, Ill.

Original application May 19, 1934, Serial No. 726,610. Divided and this application May 19, 1934, Serial No. 726,615

8 Claims. (Cl. 41—35)

The present invention relates to the producing of articles the bodies of which are of fibrous material and are so provided with a thermoplastic substance of a resinous base as to present in the produced articles given and predetermined physical properties and characteristics with or without decorative or artistic effects, and among the objects of the invention is to provide novel articles of the character mentioned above and a novel process of producing the same.

The method or process of this invention generally comprises providing the article body with a thermoplastic substance having the characteristics and properties later more fully described, with or without decorative or ornamental means or media, and subjecting the aggregate to heat and pressure to effect the finished article.

The thermoplastic substance referred to is in the class of synthetic resinous compounds known as the vinyl resins of the polymerization group and more particularly those which are permanently thermoplastic, characterized by the bond group or radical —CH:CH$_2$, and which are insoluble in most all known solvents, particularly the hydrocarbon solvents, except the solvents of the ester type or the higher ketones, such as hexone and butyrone. In other words, the substance used in this invention is chemically inert to the extent indicated above and hence is impervious to and proof against moisture, water, acids, alkalies, alcohols, oils, greases, fats, and the like. In its normally pure state it is odorless, tasteless, colorless, and transparent. It is also non-inflammable. It may be given any color or made translucent or opaque as desired by the incorporating or mixing therewith of dyes, pigments, fillers, or the like. It is also tough, durable and resilient. It also has a very strong bonding or adhesive property. If a pliant characteristic be desired, a plasticizer may be added to it to the extent of the pliability required. It may be applied either in liquid or solid form or both. In the solid or non-liquid state it may be in any desired form, such as sheets, films, strips, bars, rods, and the like. When using this substance in liquid form, acetone preferably is used as the solvent but it is to be understood other solvents as mentioned above may be used without affecting the idea of invention herein disclosed.

Another object of the invention is to provide a novel method of producing inlays or the like and a novel article having such inlays and similar decorative features.

Other objects, capabilities, advantages, and the like, are comprehended by the invention as will later appear and as are inherently possessed by the invention.

This is a division of my co-pending application identified under Serial No. 726,610, filed May 19, 1934.

Referring to the drawing:

Fig. 1 is a face view of part of an article wall showing decoration with inlays effected in a novel manner;

Fig. 2 is a section taken in planes represented by line 3—3 in Fig. 1 before the elements are compressed;

Fig. 3 is a similar view after the elements have been compressed;

Fig. 4 is a view similar to Fig. 2 but taken in a transverse plane represented by line 5—5 in Fig. 1 of the drawing, showing the elements before compression; and, Fig. 5 is a similar view showing the elements after compression.

Referring more in detail to the drawing, the article shown by way of illustration of the invention, comprises a wall portion with inlays or the like effected in a novel way. The body is preferably made from a sheet of fibre board or the like. The portion shown comprises such a sheet 170 upon a surface of which is a covering 171 of the thermoplastic substance which after being subjected to heat and pressure, enters or penetrates into the interstices of the surface portion of the sheet. Upon the covering 171 is a decorative layer or covering 172 which also may be of the thermoplastic substance with coloring matter, such as a dye, pigment or filler or the like, or may be a decorated sheet such as decorated silk impregnated with the thermoplastic substance the latter being preferably transparent with or without color or the like. On the covering 172 is a decorative sheet 173 which preferably is wood veneer which may or may not be covered or coated with the thermoplastic substance as desired. The veneer sheet has die cut apertures 174, 175, 176 and 177 in which the inlays are eventually located after heat and pressure have been applied to the assembly. Before the veneer sheet is located in place, inlay strips or ribbons or the like of any given or desired colors, texture, design, simulation, etc., such as strips 178 and 179, are so placed or located on the covering 172 as to be opposite or in registry with the apertures, such as the apertures 175 and 176, of the veneer sheet 173 when the latter is placed over the covering 172 as above explained. Such strips may also be placed to register with the apertures 174 and 177, but for the purpose of illustrating the inlaying with colored thermoplastic substance, the strips may be omitted under certain apertures, such as apertures 174 and 177 whereby when the assembly is later subjected to heat and pressure portions of the colored thermoplastic covering 172 will form the inlays in said apertures. Over the veneer is a covering 180 of transparent thermoplastic substance. Figs. 2 and 4 show in section the relationship of the elements before the assembly or aggregate is subjected to heat and pressure and Figs. 3 and 5 are similar views showing the same after the application of pressure and heat.

The thermoplastic substance may be applied either in liquid or sheet form, but preferably in the latter, wherein the sheet 171 is first placed upon the surface of the sheet 170; then sheet 172 is placed on sheet 171, then strips 178 and 179 are located on sheet 172; then veneer 173 is placed over sheet 172 and supported upon strips 178 and 179, and then sheet 180 is placed on the veneer to extend over it and beyond it and over the sheet 172. The veneer sheet may be previously covered or coated with the thermoplastic substance, but if not, then a sheet of the thermoplastic substance will be applied to each face of the veneer. If the space between sheets 172 and 180 beyond the edges of the veneer should require it, strips, such as strips 181 and 182, may be used to avoid any shortage or insufficiency of the thermoplastic substance when fused and molded by the heat and pressure applied to the assembly.

The assembly or aggregate is then subjected to heat and pressure. This is effected by the application of properly shaped heated dies. The heat of and the pressure by the dies cause the thermoplastic substance to fuse and become fluidal so that it flows and is molded to conform to the confining faces of the dies. In this case the die faces are preferably polished so that the surface of the covering 180 will be left glossy or lustrous. The fused thermoplastic substance will enter or penetrate into the interstices of the fibrous sheet 170, 173, the inlays 178 and 179, and a decorative sheet (172) if one be used in lieu of a colored layer 172 of the thermoplastic material.

Upon applying pressure, the parts are compressed so that portions 183, 184, 185, 186, 187 and 188 of the fibrous sheet 170 will be displaced and will press into the spaces at each side of the veneer sheet and the apertures thereof as shown in Figs. 3 and 5. The thermoplastic substance of the layers 171, 172, 181 and 182 likewise will be displaced besides uniting and blending together as also uniting and blending with the layer 180 to form inlay portions 190, 191, 192 and 193. See Fig. 5. In this way the united and blended displaced portions thereof fill the apertures 174 and 177 as also the spaces at the sides of the veneer sheet thus providing for molded-in inlays in said apertures, the inlays showing the color or decorative effect possessed by the layer or sheet 172 in said apertures and at the sides of the veneer sheets.

Similarly, the portions 178' and 179' of the strips 178 and 179 opposite the apertures 175 and 176 in the veneer sheet will be displaced and be located in and substantially fill the apertures 175 and 176, these portions 178' and 179' being otherwise embedded in the thermoplastic substance blending with the surface covering 180. See Figs. 3 and 5. Since the covering 180 is transparent, the color or decoration of the inlays 178' and 179' and the thermoplastic substance 172 or decorative sheet embedded therein, if one be used, and the graining of veneer sheet 173, are all clearly visible. The effect produced is, in this example, a veneer with colored or decorative inlays. The surface of the covering 180 being glossy or lustrous, gives the article a beautiful and elegant appearance.

After the compressing and molding are completed, the article and dies are cooled while maintaining the pressure, and then the dies are removed. On cooling the molded thermoplastic substance solidifies so that the article is practically an integral unit.

Thus is provided a simple and novel method of inlaying by merely displacing the inlay material in the inlay apertures and so uniting the thermoplastic substance thereto as to maintain the inlays in place. The painstaking care previously required to accurately cut the inlay pieces to exact shape and size of the inlay recess, is, by the present invention, wholly avoided or eliminated.

If desired, when assembling the parts, each part may be coated with the thermoplastic substance and the coating allowed to dry, and then the parts assembled. The adherence and uniting of the parts will then be effected when the thermoplastic substance is fused or made fluidal under heat and pressure, or, instead of coating the parts as stated, and which is preferable, sheets of the thermoplastic substance may be placed upon the surfaces of the parts and the aggregate then subjected to heat and pressure to fuse the thermoplastic sheets to unite the parts together in a unitary and rigid article.

When convenient instead of deriving all of the heat from the dies to produce the desired effect, the assembly of the parts may be separately heated in any suitable manner, not sufficient to cause the thermoplastic substance to prematurely fuse or become plastic before the dies are applied. In such case, the dies will not need to be heated as much as when all of the heat necessary for the desired effect must be supplied wholly from the dies. The added heat when the dies are applied, will be sufficient to render the thermoplastic substance fluidal and become molded as described above. In that way a more thorough and a quicker thermoplastic action is effected, and the time of cooling is decreased. Less heat is necessary in the dies and hence the dies cool more quickly.

While I have disclosed an embodiment of the invention and a mode of producing it, it is to be understood that the invention is not limited thereto but comprehends other constructions, details, arrangements of parts, features and process steps without departing from the spirit of the invention.

Having thus disclosed the invention, I claim:

1. A method of inlaying comprising juxtaposing an inlay element and a member having an inlay opening with a portion of said element in registry with the opening of said member, embedding said element and member in a fused thermoplastic substance of a resinous base, and solidifying said substance to unite said element and member and to maintain the relation thereof.

2. A method of making an article with inlay comprising juxtaposing an inlay element of non-plastic material, an inlay member having an inlay opening of an area substantially less than said element and overlying a part of said element, a sheet of fibrous material to form the body of the article and layers or coverings of a thermoplastic substance of a resinous base, subjecting the aggregate to heat and pressure to cause such a displacement of a portion of the inlay element as to enter and substantially fill the inlay opening in said member and to so fuse and displace said substance as to cause the latter to unite with said element, member and sheet to form a substantially integral unit and to form a covering for the article, and solidifying said substance to form a substantially solid unit.

3. An inlay structure comprising an inlay member having an inlay opening, an inlay element of sheet material extending into said opening to substantially fill it, and a covering of a solidified thermoplastic vinyl resin of the bond group CH:CH₂ united to and uniting said element and member to form a substantially integral unit.

4. An inlay structure comprising an inlay member having an inlay opening, an inlay element of sheet material extending over said opening and having a portion thereof so displaced as to substantially fill said opening, and a covering of a solidified thermoplastic vinyl resin of the polymerization group united to and uniting said element and member to form a substantially integral unit.

5. An article with an inlay structure comprising a body of fibrous material, a covering of solidified thermoplastic vinyl resin of the polymerization group united to said body and having embedded therein juxtaposed decorative elements of which one has an inlay opening and of which another has a portion so displaced as to form an inlay in said opening.

6. An inlay structure comprising an inlay member having an inlay opening, an inlay element of sheet material of such greater area than said opening that regardless of the shape of the opening the element may be displaced to substantially fill the opening, said element having been so displaced, and a covering of a solidified thermoplastic material united to and uniting said element and member to form a substantially integral unit.

7. An inlay structure comprising an inlay member having an inlay opening, an inlay element of sheet material so placed as to underlie said opening to give an inlay effect, said element being of any shape but of sufficient area to underlie the entire opening, and a covering of a solidified thermoplastic material united to and uniting said element and member to form a substantially integral unit.

8. An inlay structure comprising an inlay member having an aperture, an inlay element juxtaposed with said member and being of substantially greater area than said aperture so that a portion of said element registers with said aperture to appear therethrough, and bonding material to unite said member and element into a unitary structure.

EDWARD C. SLOAN.